United States Patent
Kinoshita et al.

(10) Patent No.: US 6,704,875 B1
(45) Date of Patent: Mar. 9, 2004

(54) METHOD OF OPERATION CONTROLLER HAVING PROCESSOR FOR CONTROLLING INDUSTRIAL MACHINE

(75) Inventors: Jiro Kinoshita, Oshino-mura (JP); Kazunari Aoyama, Oshino-mura (JP); Yukio Okamura, Oshino-mura (JP)

(73) Assignee: Fanuc Ltd., Minamitsuru-gun ( * ) Notice: Subject to any disclaimer, the term of this patent is extended or adjusted under 35 U.S.C. 154(b) by 0 days.

(21) Appl. No.: 09/155,827

(22) PCT Filed: Feb. 6, 1998

(86) PCT No.: PCT/JP98/00510
§ 371 (c)(1),
(2), (4) Date: Oct. 6, 1998

(87) PCT Pub. No.: WO98/35273
PCT Pub. Date: Aug. 13, 1998

(30) Foreign Application Priority Data

Feb. 6, 1997 (JP) ................................................ 9-36944

(51) Int. Cl.$^7$ ........................... G06F 1/26; G05D 23/00; G01K 3/00
(52) U.S. Cl. ...................... 713/300; 713/324; 700/299; 702/130; 702/145
(58) Field of Search ................................. 713/300, 310, 713/320, 321, 322, 323, 324, 330, 340; 702/99, 130, 105, 96, 132, 145; 700/174, 175, 207, 299

(56) References Cited

U.S. PATENT DOCUMENTS 3,626,385 A * 12/1971 Bouman ...................... 700/159
4,698,655 A * 10/1987 Schultz ....................... 357/23.4
4,907,117 A * 3/1990 Pease et al. ................... 361/54

(List continued on next page.)

FOREIGN PATENT DOCUMENTS

| JP | 54-41516 | 8/1952 |
|---|---|---|
| JP | 64-20990 | 1/1989 |
| JP | 3-107711 | 6/1991 |
| JP | 3-163603 | 7/1991 |
| JP | 3-294904 | 12/1991 |
| JP | 4-57107 | 2/1992 |
| JP | 4-95109 | 3/1992 |
| JP | 4-281424 | 10/1992 |
| JP | 5-150818 | 6/1993 |
| JP | 5-297993 | 11/1993 |
| JP | 5-303417 | 11/1993 |
| JP | 7-5425 | 1/1995 |
| JP | 7-311634 | 11/1995 |
| JP | 9-179623 | 7/1997 |

Primary Examiner—Tim Vo
(74) Attorney, Agent, or Firm—Staas & Halsey LLP

(57) ABSTRACT

A method of operating a controller of an industrial machine capable of reducing a rise in temperature of a processor, easily restoring and resuming the operation even if the operation is stopped by the rise in temperature, and further possibly preventing the stop of the operation of the controller by the rise in temperature. When temperature in the controller is lower than a set value, the processor performs a plurality of processings in each predetermined period to do normal operation. When the temperature rises to a set value or higher, processing related to the controlling axes is stopped, a motor is stopped, and the processor performs only minimum or limited required processing, i.e., processing related to a man/machine interface such as processing related to a programmable controller and processing for display and operates in a low-electric-power consumption mode except the period when the processor performs the minimum or limited required processing. In addition, as the temperature rises, the operating speed of a machine controlled by the controller is reduced to reduce heat generation and the rise in temperature of the processor.

8 Claims, 5 Drawing Sheets

U.S. PATENT DOCUMENTS

| | | | | |
|---|---|---|---|---|
| 5,249,741 A | * | 10/1993 | Bistline et al. | 236/49.3 |
| 5,448,143 A | * | 9/1995 | Pecone | 318/434 |
| 5,513,361 A | * | 4/1996 | Young | 395/750 |
| 5,534,854 A | * | 7/1996 | Bradbury et al. | 340/648 |
| 5,631,852 A | * | 5/1997 | Chen | 702/130 |
| 5,726,874 A | * | 3/1998 | Liang | 363/141 |
| 5,835,885 A | * | 11/1998 | Lin | 702/99 |
| 5,848,282 A | * | 12/1998 | Kang | 395/750.05 |
| 5,977,733 A | * | 11/1999 | Chen | 318/434 |
| 6,065,930 A | * | 5/2000 | Sato et al. | 416/39 |

* cited by examiner

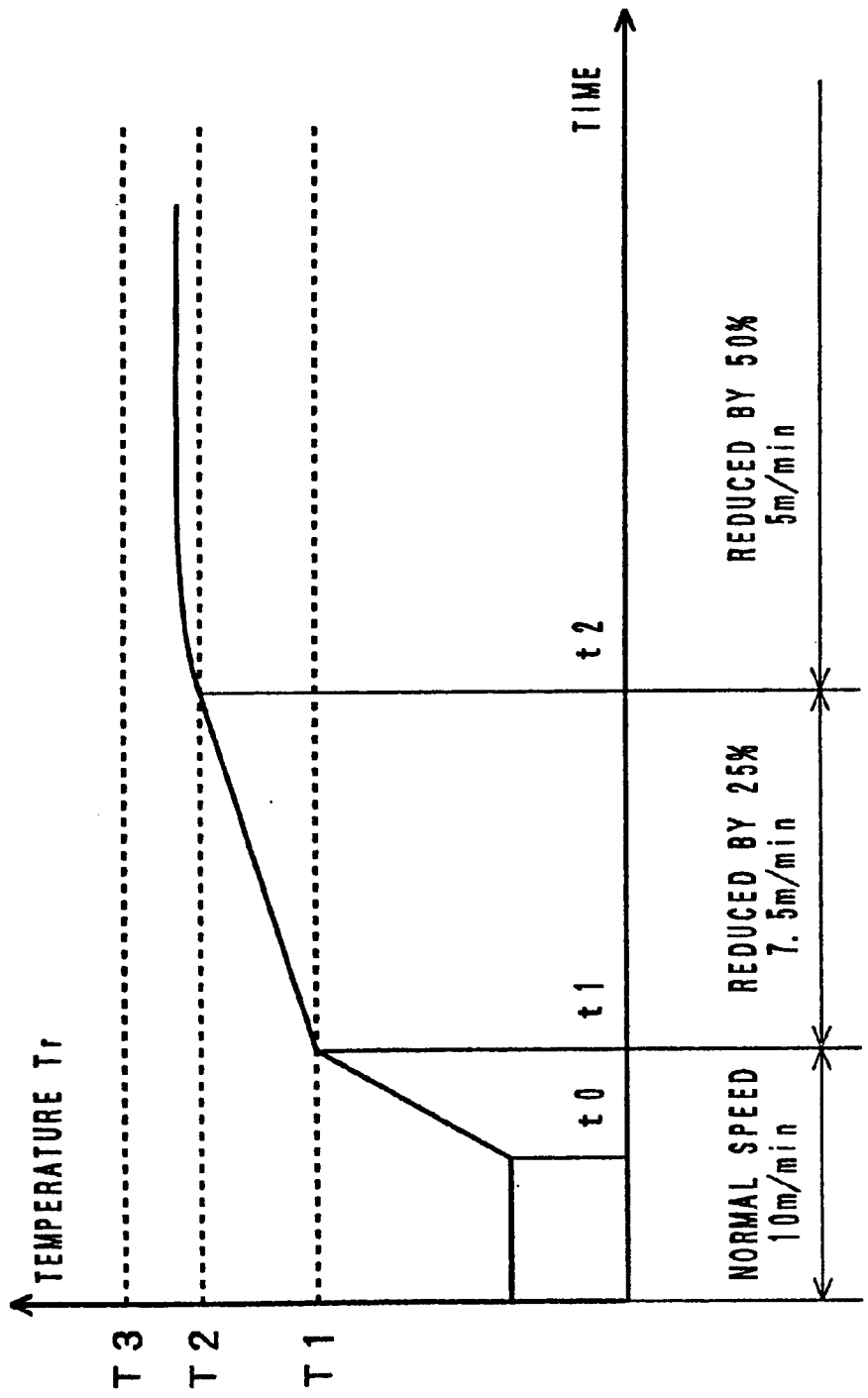

METHOD OF OPERATION CONTROLLER HAVING PROCESSOR FOR CONTROLLING INDUSTRIAL MACHINE

TECHNICAL FIELD

The present invention relates to an operation method of a controller for controlling an industrial machine such as a machine tool, and more specifically to an operation method of a controller having a processor, such as a CNC (computerized numerical control) apparatus for controlling a machine tool or a robot controller for controlling a robot.

BACKGROUND ART

In the CNC apparatus for controlling a machine tool and the robot controller for controlling a robot, a processor is used. There are cases where the processor causes a thermal runaway or elements thereof are destroyed by heat generated by the processor itself as the generated heat increases with an increase of consumed electric power in high-speed processing of the processor. A conventional method adopted for preventing the runaway and the destruction of elements is to improve heat radiation from the processor so as to prevent a rise in temperature of the processor using a heat sink and/or a fan. However, if a fan stops or efficiency of the heat radiation drops by inappropriate ventilation to rise the temperature of the processor abnormally, there is a possibility of causing the thermal runaway of the processor and further the thermal destruction. In order to avoid such possibility, the controller is alarm-stopped, driving of a motor of a machine which is drivingly controlled by the controller is stopped, and operation of the entire system is stopped.

As a method of preventing heat generation of a processor in the field of portable personal computers, there has been developed a computer having a processor capable of operating in a low electric-power-consumption mode for reducing heating.

Even if operation of the entire control system is stopped by stopping a motor when a stop of a fan or an abnormal temperature is detected, the temperature of the controller does not drop immediately. In some cases, there remains a risk that the processor would be destroyed by heating. Another problem is that such emergency stop due to a rise of temperature happens while a machine is working or operating, to require a long time to restore the machine after the emergency stop. Further, in CNC apparatuses and the like, when a motor stops and machining is interrupted, a workpiece being machined has to be abandoned. Furthermore, in unmanned operation, it is a problem that after an emergency stop, the control device does not operate for a long time, so that machining does not proceed.

DISCLOSURE OF INVENTION

An object of the present invention is to provide an operating method for a controller in which a rise in temperature of a processor is reduced, and control operation is restored and resumed easily even if the control operation is stopped due to the rise in temperature.

Another object of the present invention is to provide an operating method for a controller in which the controller continues its control operation by possibly preventing a stop of the operation.

According to one aspect of the present invention, a method of operating a controller comprises the steps of: detecting an operating state of a cooling fan for cooling an interior of the controller; detecting temperature inside the controller; and making the processor perform only minimum processing required for resuming a control operation thereof in the plurality of processings to be regularly performed by the processor in every predetermined period and operate in a low-electric-power consumption mode in a time period except the time period for performing the minimum processing when a stop of the cooling fan is detected or the detected temperature is higher than a set value.

According to another aspect the invention, a control method for a controller comprises the steps of: detecting a temperature inside the controller; and controlling the industrial machine by changing an operating speed of the industrial machine depending on the detected temperature to reduce a rise in temperature in the controller. Thus, a rise in temperature of the processor is reduced. In addition, a rise in temperature of the processor is reduced by reducing luminous energy of a back light provided in a display device or turning off the back light or by changing an acceleration/deceleration time constant for a motor controlled by the controller.

BRIEF DESCRIPTION OF THE DRAWINGS

FIG. 5 is a diagram for showing a transition of the temperature rise in the second embodiment.

BEST MODE OF CARRYING OUT THE INVENTION

The present invention relates to a method of operating a controller having a processor, for drivingly controlling a motor to thereby drivingly control operation of a machine, a robot, etc. As an embodiment of the present invention, an example in which the operating method of the present invention is applied to a CNC apparatus for controlling a machine tool will be described.

Figure 1:
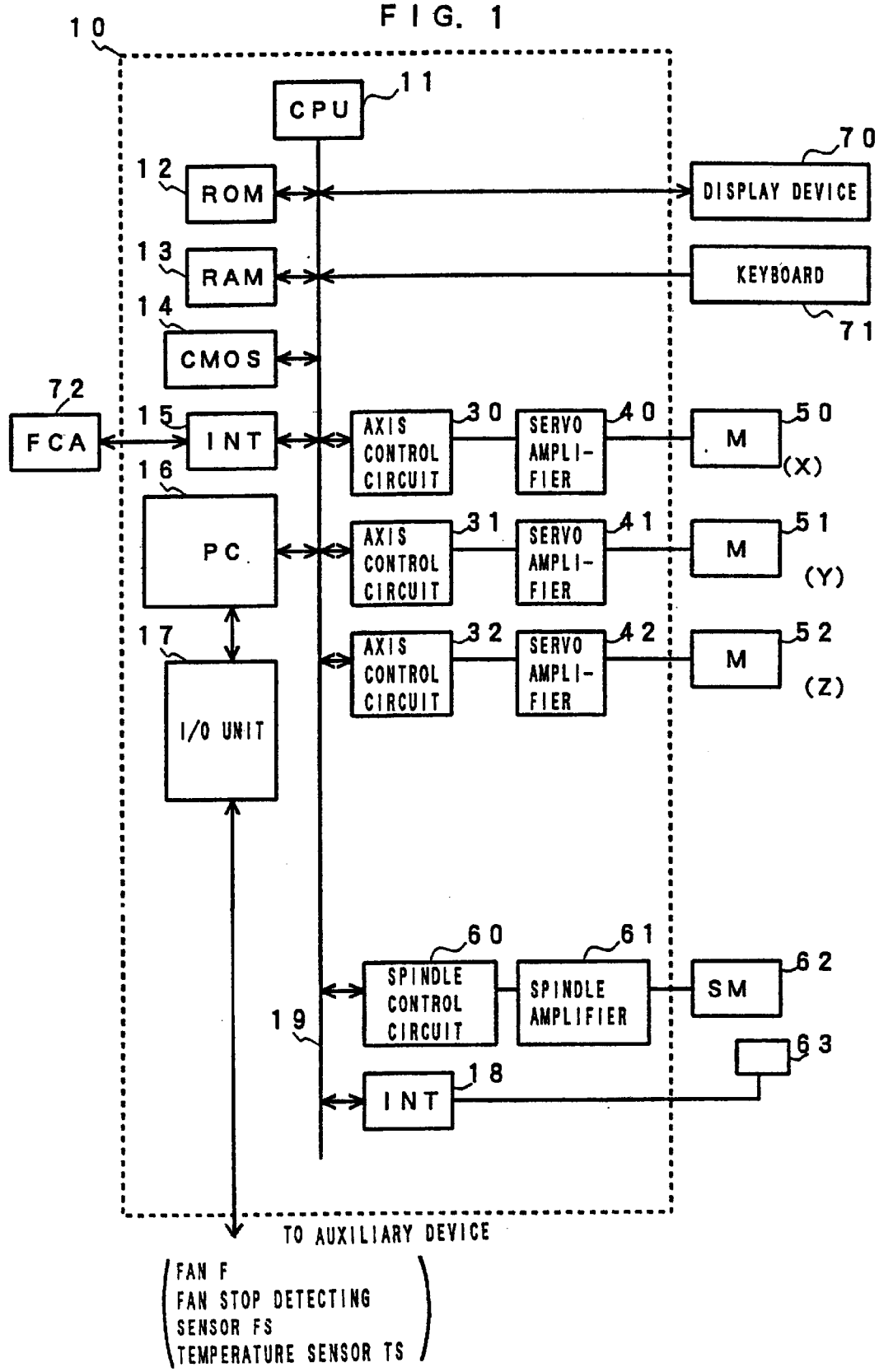
FIG. 1 is a block diagram of a CNC apparatus to which the present invention is applied.

FIG. 1 is a functional block diagram showing essential elements of a CNC apparatus 10 for drivingly controlling an NC machine tool. In the present invention, a processor capable of operating in a low-electric-power consumption mode is used as a processor 11 for generally controlling the CNC apparatus 10. The processor 11 reads, through a bus 19, a system program stored in a ROM 12, and generally controls the CNC apparatus 10 according to the system program. A RAM 13 stores temporary calculation data, display data and a variety of data inputted by an operator through a keyboard 71. A CMOS memory 14 is backed up by a battery (not shown) and functions as a non-volatile memory which retains its memorized state even when the power for the CNC apparatus 10 is switched off. The CMOS memory 14 stores machining programs read through an interface 15 or inputted using a display device 70 and the keyboard 71. In the ROM 12, a variety of system programs are memorized in advance for performing processing in an edit mode necessary for creating and editing machining programs, and processing for automatic operation.

The interface 15 is for external devices connectable to the CNC apparatus 10. An external device 72 such as a floppy cassette adapter is connected to the interface 15. Through the external device 72, machining programs are read and also machining programs edited in the CNC apparatus 10 can be stored in a floppy cassette or the like.

A PC (programmable controller) 16 controls auxiliary devices of the machine tool, such as an actuator of a robot hand for changing tools in accordance with sequence programs stored in the CNC apparatus 10. Specifically, the PC 16 converts M-function, S-function and T-function commands specified in machining programs into signals suitable for the auxiliary device according to the sequence program to output them to the auxiliary device side through an I/O unit 17. Auxiliary devices such as various actuators operates in accordance with those output signals. The PC 16 further receives signals from various switches on an operating panel provided on the body of a machine tool and performs necessary processing on those signals to forward them to the processor 11. Particularly in relation to the present invention, a temperature sensor TS is provided in the vicinity of the processor 11 in the CNC apparatus 10 so that the processor 11 can detect a signal from the temperature sensor TS through the I/O unit 17 and the PC 16. A fan stop detecting sensor FS is also provided. A fan for cooling the CNC apparatus 10 is connected to the I/O unit 17 and the processor 11 outputs a drive command to the fan F and also capable of detecting a fan stop detection signal from the fan stop detecting sensor FS through the I/O unit 17 and the PC 16.

Axis control circuits 30 to 32 for feed axes X, Y, Z of the machine tool respectively receive a motion command for their axes, which is outputted from the processor 11 in each distribution period, and perform position and speed loop processing to output a torque command to their servo amplifiers 40 to 42. Receiving the torque command, the servo amplifiers 40 to 42 drive their servo motors 50 to 52 for their axes of the machine tool. In each of the servo motors 50 to 52 for the respective axes, a position detector and a speed detector are provided, and a position feedback signal and a speed feedback signal are fed back from each position detector and each speed detector to each axis control circuit 30 to 32. In FIG. 1, indication of feedback of each position signal and each speed signal is omitted, and an example of a machine tool having three feed axes is shown.

A spindle control circuit 60 receives a spindle rotation command for the machine tool and outputs a spindle speed signal to a spindle amplifier 61. Receiving the spindle speed signal, the spindle amplifier 61 makes a spindle motor 62 rotate at a commanded rotating speed. To the spindle motor 62, a position coder 63 is connected by a gear, a belt or the like. The position coder 63 outputs a feedback pulse in synchronism with the rotation of the spindle and the feedback pulse is read by the processor 11 through an interface 18.

The above described structure of the CNC apparatus is not different from the structure of conventional CNC apparatus. The present invention differs from the conventional method in controlling the operation of the CNC apparatus when a stop of operation of a fan or a rise in temperature is detected.

Figure 2A:
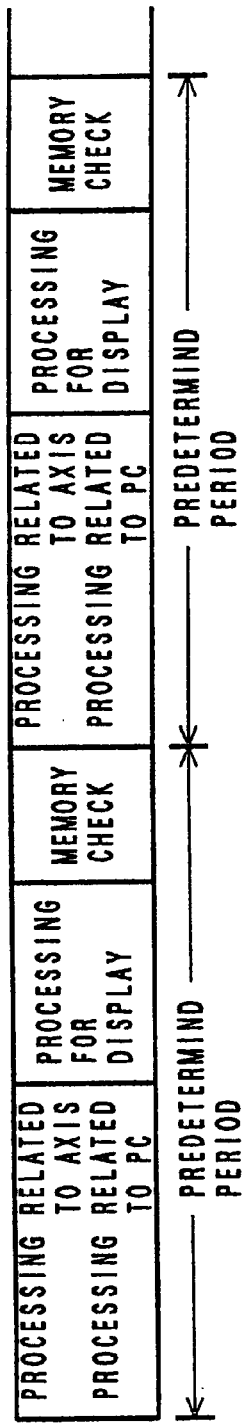
FIGS. 2a and 2b are schematic diagrams for showing regular processing to be performed by a processor of a CNC apparatus, and processing in a low-electric-power consumption mode when temperature rises, according to a first embodiment of the invention.

The processor 11 of the CNC apparatus commands to drive the spindle motor and the servo motors 50 to 52 for the respective feed axes in accordance with an NC machining program stored in the CMOS memory 14 to thereby machine a workpiece. In a regular state, the processor 11 performs processing including calculation of a position of each axis, distribution of a motion command to each axis control circuit 30 to 32 for each axis, processing related to the PC, processing for display, memory check for program protection under interruption control in a predetermined period, as shown in FIG. 2a.

Figure 2B:
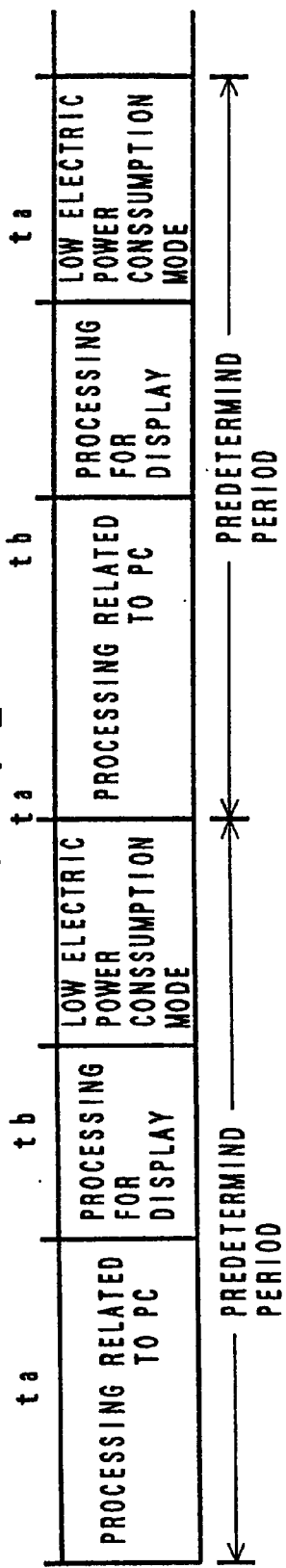

When the fan stop signal is outputted from the fan stop detecting sensor FS through the I/O unit 17 and the PC 16, or temperature in the CNC apparatus 10 detected by the temperature sensor TS reaches a predetermined value, the processor 11 stops driving of the servo motors 50 to 52 for the respective axes and the spindled motor 62, and transfers to processing in a low-electric-power consumption mode, as shown in FIG. 2b.

Specifically, since the driving of the servo motors 50 to 52 and the spindle motor 62 is stopped, processing related to the axes control such as calculation of a position of each axis, distribution of a motion quantity to each axis, etc. is not necessary, and therefore not performed. The memory check is not performed, either. Only minimum processing necessary resuming control operation is performed. First, in consideration that an operator may perform some operation in order to take some measure, the processor 11 performs processing related to the PC and processing for display which are necessary for keeping a man/machine interface effective, in the same way as in the regular mode. Thus, dialogue between the CNC apparatus 10 and the operator is made possible. Then, the processor 11 transfers to a low-electric-power consumption mode. In the low-electric-power consumption mode, the processors 11 does not perform processing which is not required for the present state, such as introduction of a clock to a calculation and performing of the calculation. Instead, the processor 11 performs minimum processing required for keeping the CPU in an operating state, such as clock processing, processing for keeping coherence between a cache memory and a main memory. When a fixed time period passes, the processor 11 transfers to a normal mode in which is performs processing related to the PC and processing for display, again. When a further fixed time period passes after the processor 11 has transferred to the normal mode, the processor 11 transfers to the low-electric-power consumption mode, in which it performs only the above mentioned processing. Referring to FIG. 2b, at each point of time ta, each time the fixed time period elapses, the processor 11 transfers to the normal mode, and at every point of time tb, each time a predetermined time elapses from each point of time ta, the processor 11 transfers to the low-electric-power consumption mode. The processor 11 repeats such switching of the modes. While this switching of the modes is repeated, since the processor 11 does not perform processing related to the axes control and only performs minimum processing required for resuming control operation, heating of the processor 11 is reduced to prevent thermal runaway and thermal destruction of the processor 11.

Figure 3:
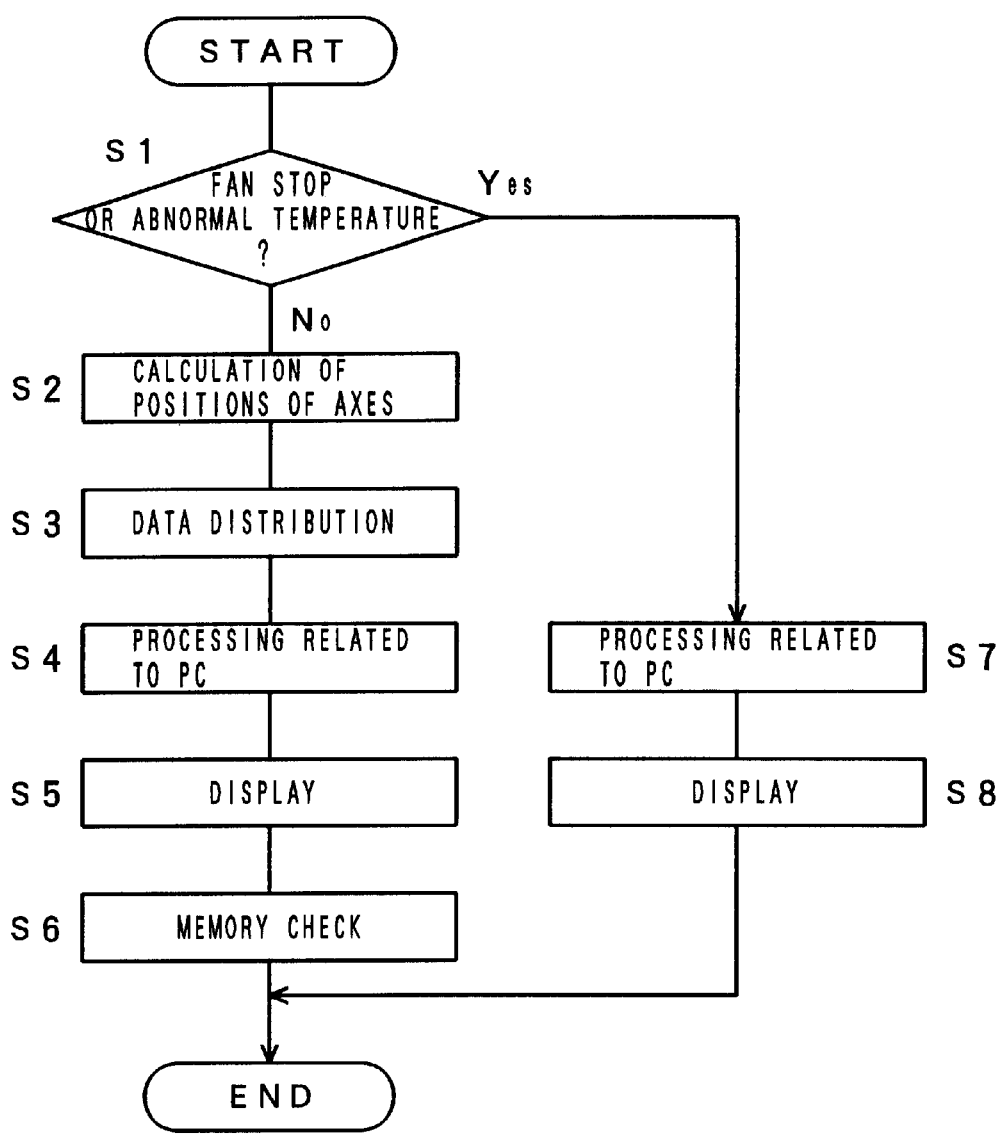
FIG. 3 is a flowchart of processing to be performed by the processor in the first embodiment.

FIG. 3 is a flowchart showing the above described processing to be performed by the processor 11.

The processor 11 determines whether or not the fan stop signal is inputted and whether or not the detected temperature is equal to or higher than a predetermined value (Step S1). If the fan stop signal is not inputted and the temperature detected by the temperature sensor is lower than the predetermined value, the processor 11 calculates positions of the respective axes according to the NC machining program (Step S2), and outputs distributed data of a motion command to the axis control circuits 30 to 32 for the respective axes (Step S3).

Then, the processor 11 performs processing of information cooperatively with a processor of the PC 16, displays necessary information on the display device 70 (Steps S4, S5), and performs memory check (Step S6). Thus, the processor 11 ends the processing of the present processing cycle.

If the fan stop signal is detected or it is determined that the detected temperature reaches a predetermined value at Step S1, the processor 11 performs only the aforementioned processing related to the PC and the processing for display (Steps S7, S8), to terminate processing of the normal mode, and performs processing in the lowe-lectric-power consumption mode such as clock processing, processing for keeping coherence between the cache memory and the main memory (not illustrated). Thus, the processing to be performed by the processor 11 is little, so that a rise in temperature of the processor 11 is reduced.

In the above embodiment, in order to protect the processor 11, when the fan stops or the detected temperature reaches a predetermined value, driving of the motors is stopped and processing related to the axes control is omitted to thereby reduce processing to be performed by the processor 11 and prevent heat generation thereof. Next, a second embodiment in which the processor 11 is protected without stopping the driving of the motors will be described.

In this second embodiment, first, there are set: a threshold value T1 for defining an upper limit of temperature below which the normal operation is allowed; a threshold value T2 higher than the threshold value T1, for defining an upper limit of temperature below which a first operation stage in the low-electric-power consumption mode is allowed; a rate of dropping the operating speed, i.e., the feeding speed of the axes in that first stage (override value) n1[%]; a limit temperature T3 higher than the threshold value T2 for the first operation stage in low-electric-power consumption mode, for defining a value below which a second operation stage in the low-electric-power consumption mode is allowed and at or above which the operation is stopped; a rate of dropping an operating speed in the second operation stage in the low-electric-power consumption mode (override value) n2[%]; an acceleration/deceleration time constant for the normal operation; and an acceleration/deceleration time constant for the first and second stages in the low-electric-power consumption mode.

The values T1, T2, T3 are set as T1<T2<T3, and the values n1, n2 are set as n2<n1. The acceleration/deceleration time constant for the first and second stages in the low-electric-power consumption mode is larger than that in the normal operation mode to make the acceleration/deceleration period longer.

Figure 4:
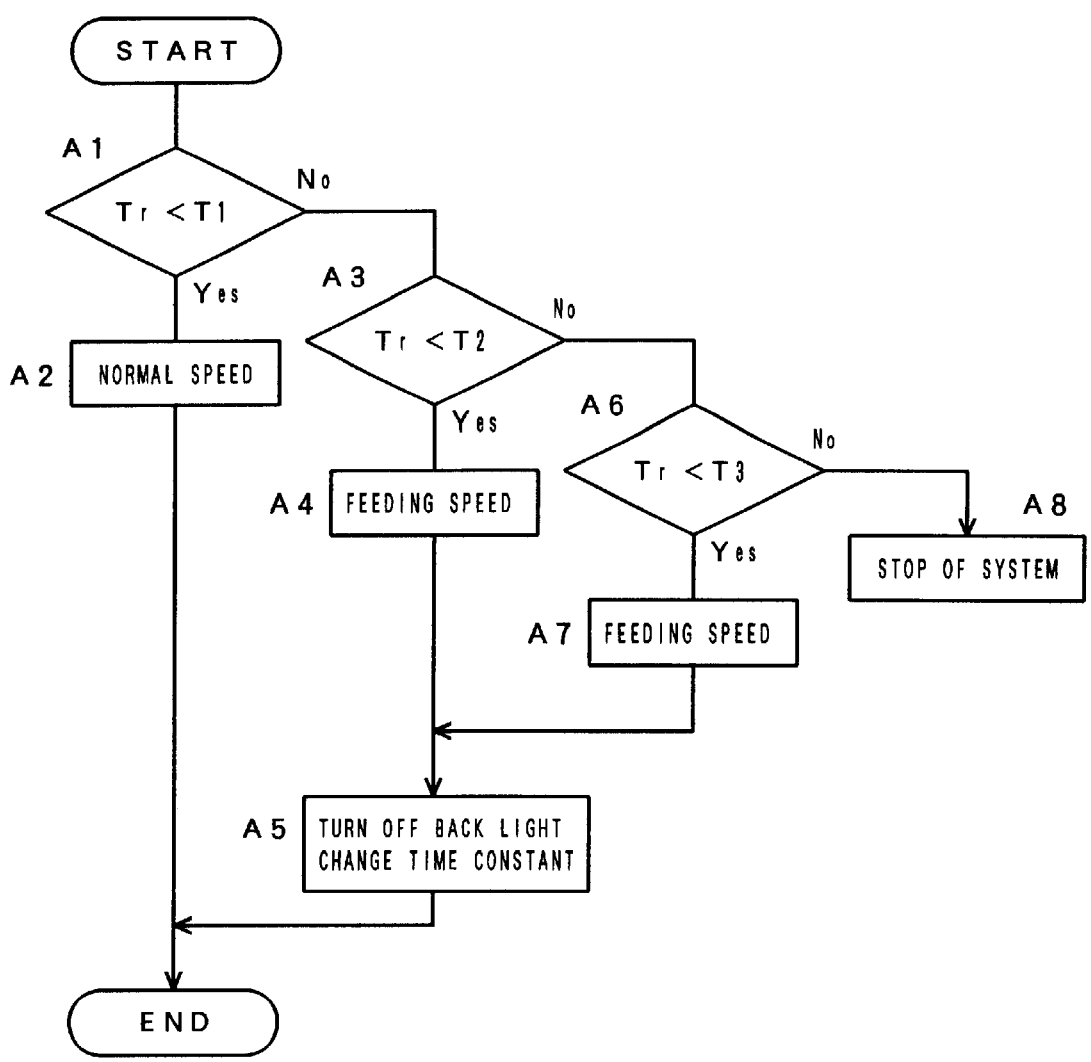
FIG. 4 is a flowchart of processing to be performed by the processor in a second embodiment of the invention.

Based on the above, the processor 11 performs processing shown in FIG. 4 in each predetermined processing cycle.

The processor 11 determines whether or not the temperature Tr in the CNC control device 10 detected by the temperature sensor is lower than the set threshold T1 below which the normal operation is allowed (Step A1). If it is lower than the threshold T1, the processor 11 performs the normal operation at a normal speed (Step A2). In accordance with the NC machining program, the processor distributes motion commands to the respective axes and drives the servo motors 50 to 52 for the respective axes with a feeding speed designated in the NC machining program. The acceleration/deceleration time constant used in this case is the set value for the normal operation.

In Step A1, if the detected temperature Tr is equal to the threshold T1 or higher, the processor 11 proceeds to Step A3, where it is determined whether or not the detected temperature Tr is lower than the set threshold T2 defining an upper limit of temperature for the first stage in the low-electric-power consumption mode. If it is lower than the threshold value T2, a feeding speed in this case is set to a value obtained by multiplying the feeding speed designated in the NC machining program by the override value n1 set for the first stage in the low-electric-power consumption mode (Step A4). The processor 11 further turns off the back light of the display device 70 (or instead, reduces luminous energy of the back light to darken it so as to reduce heat generation), and changes the acceleration/deceleration time constant to the value set for the low electric power consumption mode (Step A5).

As a result, the feeding speed drops, so that calculation for obtaining motion quantities to be supplied to the respective axes in each distribution cycle becomes simpler, and thus, time required for processing related to the axes is smaller and quantity of heat generated by the processor 11 is reduced. Further, since the back light of the display device 70 is turned off and heat generation is reduced correspondingly, a rise in temperature of the CNC apparatus 10 is suppressed. Furthermore, when the acceleration/deceleration time constant is made larger, the value of current flowing through the servo motors 50 to 52 for the feed axes at the time of acceleration/deceleration is reduced. Accordingly, the heat generation of the motors is reduced, a rise in temperature of the entire system of the CNC apparatus 10 including the processor 11 is reduced.

If the detected temperature Tr is higher than the set threshold T1 and T2 but lower than the set limit temperature T3 (Step A6), the feeding speed in this case is set to a value obtained by multiplying the feeding speed designated in the program by the override value n2 set for the second stage in the low electrical power consumption mode to thereby drops the actual feeding speed steeply (Step A7). Also in this case, the processor 11 further turns off the back light and changes the acceleration/deceleration time constant to the value set for the low-electric-power consumption mode (Step A5). Thus, a rise in temperature in the CNC 10 and in the processor 11 is further reduced.

If the temperature further rises and the detected temperature Tr reaches the limit temperature T3 or higher, the system is stopped (Step A8) since there is a risk that thermal runaway or thermal destruction of the processor 11 would happen. In this case, the operation of the CNC apparatus 10 is stopped with the temperature rising slowly, since the feeding speed, that is, the operating speed is already dropped before the stop of the operation. Thus, even when the operation of the CNC apparatus is stopped, the temperature of the processor 11 can not rise steeply, so that thermal runaway of the processor 11 is prevented.

A rise in temperature in the second embodiment will be explained referring to FIG. 5. In FIG. 5, the abscissa represents time and the ordinate represents detected temperature Tr. FIG. 5 shows an example in which the feeding speed designated in the program is 10 m/min, the override values n1 and n2 for the first and second stages in the low-electric-power consumption mode are 75% and 50%, respectively.

While the fan operates, heat generation by the processor 11, etc. and cooling by the fan is equilibrated, so that the temperature in the CNC apparatus is constant. It is assumed that the operation of the fan stops at point of time t0, the equilibrium is lost and the temperature in the CNC apparatus 10 rises steeply. If the detected temperature Tr reaches the set threshold T1 at point of time t1, the feeding speed is reduced to 75% of the speed designated in the program (i.e. 7.5 m/min) as described above, the back light is turned off and the acceleration/deceleration time constant is made larger. As a result, a rise in temperature is made slow.

Then, if the detected temperature Tr reaches, at time point t2, the set threshold T2 for the second stage in the low-electric-power consumption mode, the feeding speed is further reduced to 50% of the speed specified in the program, i.e., 5 m/min. As a result, the heat generation is reduced, and the rise in temperature in the CNC apparatus is further reduced. In the example of FIG. 5, the heat generation and the radiation by natural ventilation are equilibrated at this stage, so that the rise in temperature stops and the equilibrium is maintained.

In the present invention, the processor performs only minimum required processing in each processing cycle and operates in the lowe-lectric-power consumption mode for the rest of time, when operation of the cooling fan of the controller stops or when the temperature in the controller rises. Therefore, heat generation of the processor is reduced to suppress the rise in temperature. Further, since the above-mentioned minimum required processing is related to a man/machine interface, the operation can be easily restored and resumed.

Furthermore, an operating speed of a machine, a robot, etc. which is controlled by the controller is reduced as a temperature in the controller rises, so that a load on the processor is reduced to suppress the heat generation and the rise in temperature of the processor. Thus, the operation of the machine, the robot and the like can be continued without stopping the operation of the controller.

What is claimed is:

1. A method of operating a controller using a processor for controlling an industrial machine having axes and at least one motor for the axes, said processor performing a plurality of processings in every predetermined period and being capable of operating in a low-electric power consumption mode, said method comprising:

detecting an operating state of a cooling fan for cooling the interior of said controller;

detecting temperature inside said controller;

making the processor perform only minimum or limited processing required for resuming control of the axes in said plurality of processings to be regularly performed by the processor in every predetermined period and operate in a low-electric power consumption mode in a time period except the time period for performing said minimum or limited processing, when a stop of said cooling fan is detected or the temperature is detected to be higher than a first set value; and making the processor stop driving the at least one motor and omit processing related to the control of the axes, when a stop of the cooling fan is detected or the temperature is detected to be higher than a second set value.

2. A method of operating a controller using a processor for controlling an industrial machine, comprising:

detecting a temperature inside the controller; and controlling the industrial machine by changing an operating speed of the industrial machine depending on the temperature detected to reduce a rise in temperature in said controller.

3. A method of operating a controller for controlling an industrial machine according to claim 2, wherein said controller has a display device with a back light, and wherein said controlling includes reducing luminous energy of said back light or turning off said back light depending on the temperature detected.

4. A method of operating a controller according to claim 2, wherein said controller controls a motor of the industrial machine, changing an acceleration/deceleration period for said motor depending on the temperature detected.

5. A method of controlling an industrial machine having at least one motor, using a controller having a processor, comprising:

detecting a temperature inside the controller; and controlling the industrial machine by changing operation of the at least one motor depending on the temperature detected to reduce a rise in temperature in the controller.

6. A method according to claim 5, wherein the industrial machine has at least one axis, and wherein said method further comprises:

detecting an operating state of a cooling unit for cooling the interior of the controller; and omitting processing related to controlling movement related to the at least one axis, when operation of the cooling unit is detected to have stopped or the temperature detected is higher than a set value.

7. A method according to claim 6, wherein the cooling unit includes a fan.

8. A method according to claim 6, wherein said controlling includes stopping the at least one motor to stop the movement related to the at least one axis when operation of the cooling unit is detected to have stopped or the temperature detected is higher than a set value.

* * * * *

UNITED STATES PATENT AND TRADEMARK OFFICE
CERTIFICATE OF CORRECTION

PATENT NO. : 6,704,875 B1
DATED : March 9, 2004
INVENTOR(S) : Jiro Kinoshita et al.

It is certified that error appears in the above-identified patent and that said Letters Patent is hereby corrected as shown below:

Column 3,
Line 17, please change "operates" to -- operate --

Column 4,
Line 21, please insert -- for -- before "resuming".
Line 30, please change "processors" to -- processor --.
Line 38, please change "is" to -- it --.

Column 5,
Line 12, please change "lowe-lectric-power" to -- low electric-power --.

Column 6,
Line 36, please change "drops" to -- drop --.

Column 7,
Line 18, please change "lowe-lectric-power" to -- low-electric-power --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,704,875 B1
APPLICATION NO. : 09/155827
DATED : March 9, 2004
INVENTOR(S) : Jiro Kinoshita et al.

It is certified that error appears in the above-identified patent and that said Letters Patent is hereby corrected as shown below:

On the title page at item 73, Assignee: please delete " Fanuc Ltd., Minamitsuru-gun" and insert -- FANUC LTD, Yamanashi, Japan --.

Signed and Sealed this

Second Day of October, 2007

JON W. DUDAS
*Director of the United States Patent and Trademark Office*